ABSTRACT OF THE DISCLOSURE

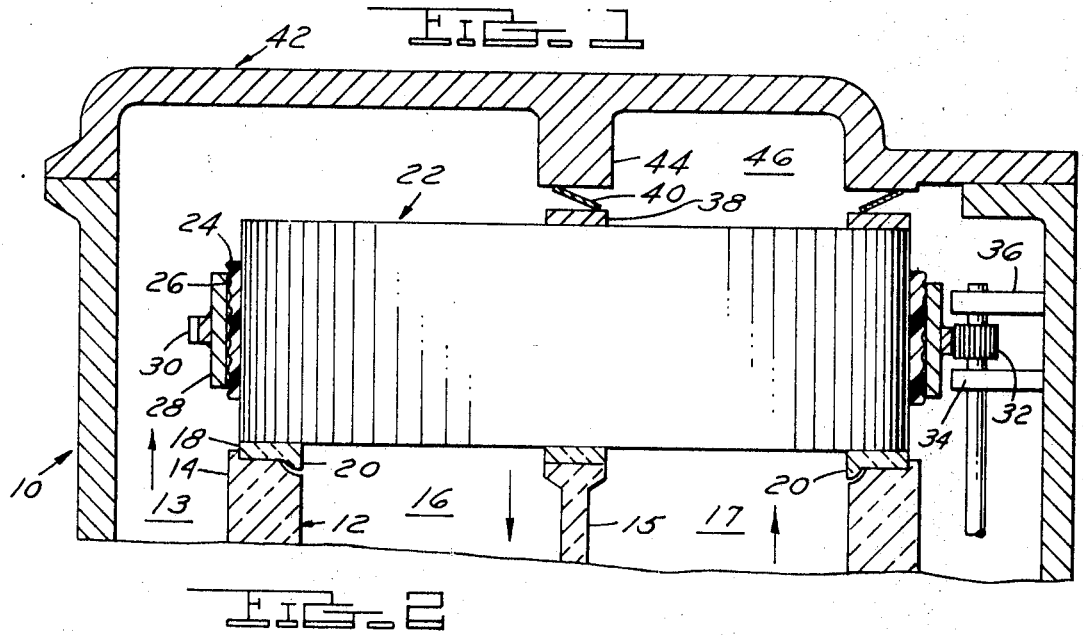
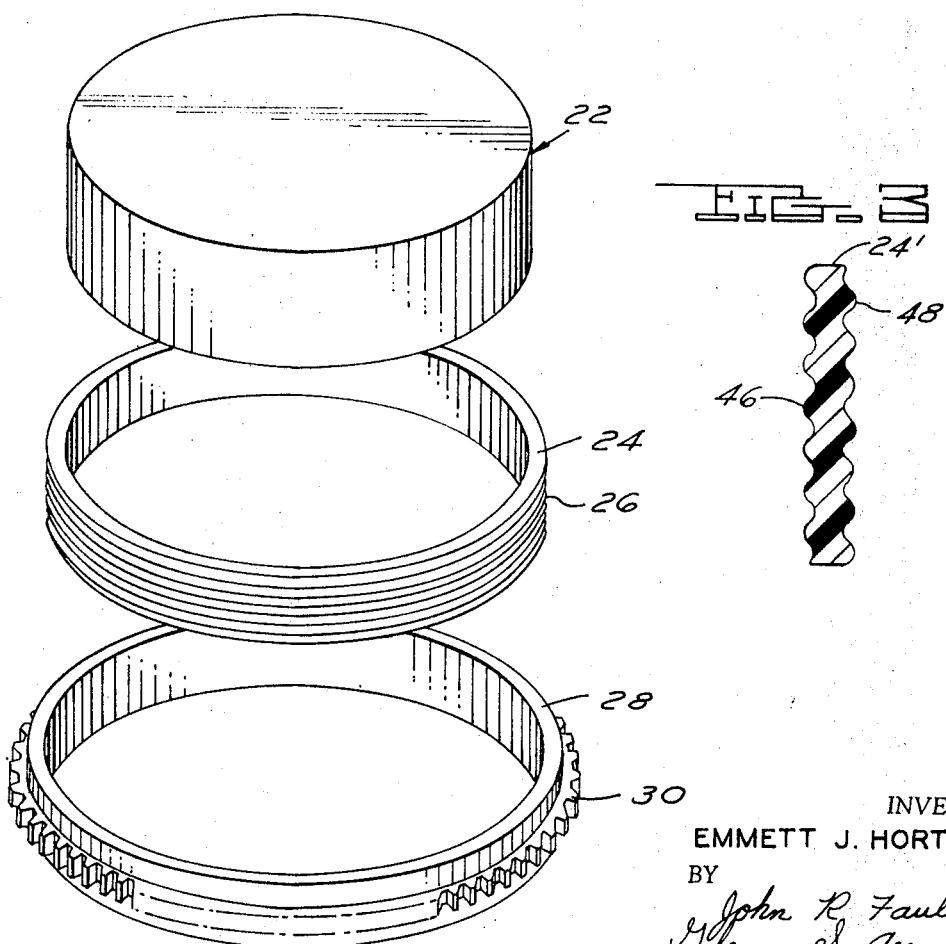
INVENTOR.
EMMETT J. HORTON 3,525,384
GAS TURBINE HEAT EXCHANGING SYSTEM USING AN ELASTOMERIC PAD FOR TORQUE TRANSMISSION
Emmett J. Horton, Dearborn, Mich., assignor to Ford Motor Company, Dearborn, Mich., a corporation of Delaware
Filed Aug. 29, 1968, Ser. No. 756,132
Int. Cl. F28d 19/04; F16h 55/12, 55/14
U.S. Cl. 165—7      6 Claims

An annular metal ring gear has its inner surface compressing an elastomeric pad against the exterior periphery of a disc-shaped regenerator core. The pad has a foamed structure and transmits driving torque from the ring gear to the regenerator core while absorbing slight radial and axial dimension changes caused by differences in thermal expansion.

SUMMARY OF THE INVENTION

The efficiency of a gas turbine engine increases directly with the temperature of the gases entering the turbine wheel, and extensive research has been directed toward finding new high temperature materials and fabricating these materials into gas turbine engine components. A portion of this research recently produced a ceramic regenerator capable of surviving for extended periods of time in the higher temperatures and of performing an efficient heat exchanging function. Metal gears are needed to drive such regenerator cores, however, and the differences in thermal expansion coefficients of the ceramic and the metal having produced considerable difficulties in finding a suitable driving system therefor. Moreover, new sealing systems also were necessary because the previously used metal seals could not survive for useful periods at the temperatures involved.

This invention provides a gas turbine engine heat exchanging system that uses a relatively inexpensive construction to drive a ceramic regenerator core. The regenerator core is disc-shaped and porous to gases flowing essentially parallel to the core rotational axis. An annular driving member surrounds the exterior periphery of the core and an elastomeric pad is compressed between the inner surface of the driving member and the exterior periphery of the core. The pad transmits driving torque from the driving member to the core, and both the pad and the driving member operate in an environment of relatively cool air furnished by the engine compressor. Pad elasticity absorbs thermal expansion differences between the core and the driving member, and the pad can distort slightly to accommodate any axial distortion. Foamed elastomers having approximately 15–30 volume percent of void space have an excellent combination of shear strength and elasticity and are particularly useful in making up the pads. A metal ring gear having gear teeth on its exterior surface usually serves as the driving member although friction-type driving systems also can be used. High engine operating temperatures are achieved by resting the core on a substantially circular ceramic inner housing having a diametrical wall dividing the inner housing into two semicircular passages. The inner housing is surrounded by the engine outer housing that forms an annular space around the core and driving membr assembly. A passage transmitting relatively cool air from the compressor to the regenerator communicates with the annular space to bathe the driving member and pad in the cool air.

The pad can be cast in place between the ring gear and the core by placing the components in a suitable mold, pouring or injecting elastomeric material between the core and the ring gear, and curing the elastomer. More desirable distortion and driving torque characteristics are achieved by extruding pad lengths with longitudinal grooves in at least one surface, spacing the pads around the core periphery, and fitting a ring gear around the pad exterior. One continuous length of pad material surrounding the entire periphery of the core can be used if desired. Pad material on the grooved surface deflects more readily to absorb axial and radial dimension changes and thereby reduces thermal stresses in the core, ring gear and associated seals. Grooves can be included on both pad surfaces or the pad can be extruded with a corrugated cross section.

BRIEF DESCRIPTION OF THE DRAWINGS

FIG. 1 is a sectional elevation of a portion of a gas turbine engine showing the installation of a heat exchanging system of this invention that uses an extruded pad having grooves on its exterior surface. FIG. 2 is an exploded view of the regenerator core, pad and ring gear of FIG. 1. FIG. 3 is a cross section of a pad having a corrugated shape.

DETAILED DESCRIPTION

Referring to FIG. 1, a gas turbine engine containing the system of this invention has an essentially elliptical metal outer housing 10 that is open at the top of the regenerator portion. FIG. 1 is sectioned along the major diameter of the elipse. A smaller ceramic inner housing 12 is located inside housing 10 and terminates a short distance from the opening thereof. Inner housing 12 comprises an outer cylindrical wall 14 divided diametrically by a wall 15 into two semicircular passages 16 and 17. Wall 14 forms an annular passage 13 between part of its circumference and housing 10. A solid ceramic rubbing seal 18 having the same shape as housing 12 is located on top of housing 12 where it is restrained from circular movement by fitting ribs 20 on the underside of seal 18 into corresponding slots on the top of housing 12. Seal 18 is made of a ceramic having good wearing properties such as a nickel oxide-calcium fluoride combination and can be formed integrally with inner housing 12.

A disc-shaped ceramic regenerator core 22 is mounted rotatably on top of seal 18. An elastomeric pad 24 contacts the entire exterior periphery of core 22. Pad 24 contains a plurality of grooves 26 on its exterior surface and the interior surface of an annular metal ring gear 28 contacts grooves 26 and compresses pad 24 against core 22.

Ring gear 28 has a plurality of gear teeth 30 on its exterior surface. A pinion gear 32 supported by two bosses 34 and 36 projecting inwardly from housing 10 meshes with gear teeth 30 so rotation of pinion gear 32 drives core 22.

A D-shaped seal 38 has its straight portion located above wall 15 and its semicircular portion located above the semicircular portion of housing 12 forming passage 17 with the bottom of seal 38 in rubbing contact with core 22. Seal 38 can be made of metal having a wearing surface on its lower side suitable for use on ceramics; a typical seal is described in U.S. patent application Whalen et al., Ser. No. 613,920, filed Feb. 3, 1967, the entire disclosure of which is incorporated herein. A metal foil seal 40 is welded to the top inner edge of seal 38.

The open portion of outer housing 10 is covered by a metal cap 42. Cap 42 has a downwardly projecting ridge 44 aligned with a diametrical wall 15 of the inner housing. Ridge 44 bears on the straight portion of foil seal 40 and a portion of the circumference of cap 42 bears on the semicircular portion of foil seal 40. Foil seal 40 is made of spring stock and is deflected by cap 42 to urge core 22 downward onto seal 18. Rotation of seal 38 is restrained by projecting fingers (not shown) on cap 42 or housing 10.

During engine operation, relatively cool air from the compressor flows up passage 13 and is turned downward by cap 42 into the porous core 22. The air passes through the left portion of core 22 and continues downward through passage 16 to the engine combustion chamber (not shown). Hot combustion gases from the combustion chamber pass initially through the turbine wheels (not shown) and then flow upward through passage 17, the portion of core 22 above passage 17, and into space 46 which exhausts the gases to the atmosphere.

The temperature of the gases in passage 17 is extremely high and can exceed 1800° F. A considerable portion of this heat is transferred by the rotating regenerator core to the air passing through the sector of the core above passage 16. Gas temperatures in space 46 are considerably less than the temperature in passage 17 so metal seals 38 and 40 survive for useful periods. Relatively cool air from passage 13 surrounds the exterior periphery of core 22 to provide a relatively cool environment for pad 24 and ring gear 28.

Pad 24 is made of a high temperature elastomer such as Dow-Corning Silastic 69, a foamed silicon rubber having a void volume of about 20 percent. The pad preferably is extruded into a length of material having grooves 26 on one side thereof. The pad is stretched around core 22, its ends are bonded together, and ring gear 28 is fitted around the pad so the ring gear exerts compressive stresses thereon.

Radial deflection of the pad accommodates radial differences in thermal expansion and axial deflection accommodates thermal distortion. Grooves 26 assist in absorbing such deflection and the pad can have such grooves on both surfaces. In the extruded pad 24' shown in FIG. 3, longitudinal corrugations 46 and 48 on each side of the pad form the grooves. The FIG. 3 pad is useful particularly where relatively large amount of thermal expansion differences are expected.

Thus this invention provides a gas turbine heat exchanging system capable of operating in relatively high temperature combustion gases for useful periods of time. The system is inexpensive but takes full advantage of the high temperature properties of a ceramic core and the wearing properties of a metal driving member and absorbs thermally induced stresses between the core and driving member.

I claim:
1. A heat exchanging system for a gas turbine engine comprising
a ceramic regenerator core mounted rotatably in said engine, said core being porous to gases flowing essentially parallel to the core rotational axis,
a high temperature elastomeric pad contacting the periphery of said regenerator core, said elastomeric pad having a plurality of grooves running circularly around at least the outer periphery of the pad, said elastomeric pad having a foamed structure containing about 15-30 percent of voids, said elastomeric pad being yieldable in the axial and radial directions to accommodate thermal expansion differences between the core and the ring gear, and
an annular metal driving means extending around and contacting the periphery of said pad, said elastomeric pad transmitting driving torque from said driving means to said regenerator core.

2. The system of claim 1 in which the pad has a corrugated cross section, the corrugations running circularly around said pad.

3. The heat exchanging system of claim 2 in which the annular driving means is a metal ring gear having gear teeth on its exterior surface.

4. The system of claim 3 in which the core rests on a substantially circular ceramic inner housing having a diametrical wall dividing said inner housing into two semicircular passages, said inner housing being surrounded by an outer housing forming an annular space surrounding said core and driving means assembly, said annular space communicating with a passage supplying relatively cool air to the regenerator core.

5. The system of claim 1 in which the annular driving means is a metal ring gear having gear teeth on its exterior surface.

6. The system of claim 1 in which the core rests on a substantially circular ceramic inner housing having a diametrical wall dividing said inner housing into two semicircular passages, said inner housing being surrounded by an outer housing forming an annular space surrounding said core and driving means assembly, said annular space communicating with a passage supplying relatively cool air to the regenerator core.

References Cited
UNITED STATES PATENTS

| | | | |
|---|---|---|---|
| 2,215,926 | 9/1940 | Hatcher | 64—27 |
| 3,167,115 | 1/1965 | Chute | 165—7 |
| 3,257,860 | 6/1966 | Runde et al. | 64—27 X |
| 3,301,317 | 1/1967 | Weaving et al. | 165—8 |
| 3,363,478 | 1/1968 | Lanning | 74—446 |
| 3,430,687 | 3/1969 | Wardale | 165—8 |

ROBERT A. O'LEARY, Primary Examiner

A. W. DAVIS, JR., Assistant Examiner

U.S. Cl. X.R.

64—11, 27; 74—443, 446; 165—8, 10